United States Patent [19]
Szott

[11] Patent Number: 5,536,018
[45] Date of Patent: Jul. 16, 1996

[54] FLEXIBLE SPAGHETTI GASKET SEAL WITH STIFFENING MEMBER

[75] Inventor: Michael J. Szott, Hanover Park, Ill.

[73] Assignee: Fel-Pro Incorporated, Skokie, Ill.

[21] Appl. No.: 339,063

[22] Filed: Nov. 14, 1994

[51] Int. Cl.$^6$ ................................................ F16J 15/10
[52] U.S. Cl. ........................ 277/1; 277/184; 277/235 B
[58] Field of Search ............................ 277/188 R, 184, 277/182, 235 B, 207 R, 208, 215, 227, 1

[56] References Cited

U.S. PATENT DOCUMENTS

| | | | |
|---|---|---|---|
| 2,410,589 | 11/1946 | Segelhorst | 277/184 |
| 3,584,889 | 6/1971 | Sheets | 277/208 |
| 3,848,880 | 11/1974 | Tanner | 277/188 R |
| 4,192,520 | 3/1980 | Hasegawa | 277/235 B |
| 4,580,794 | 4/1986 | Gibbons | 277/228 |
| 4,597,583 | 7/1986 | Inciong et al. | 277/235 B |
| 4,674,756 | 6/1987 | Fallon et al. | 277/188 R |

FOREIGN PATENT DOCUMENTS 1041916  9/1966  United Kingdom ............... 277/188 R

*Primary Examiner*—Scott W. Cummings
*Attorney, Agent, or Firm*—Laff, Whitesel, Conte & Saret, Ltd.

[57] ABSTRACT

A spaghetti seal for use in an engine sealing assembly includes a stiffening member secured to an elastomeric member. The elastomeric member is adapted for mating engagement with the stiffening member. The stiffening member provides quick and easy installation of the spaghetti seal into a narrow groove formed in an engine part.

5 Claims, 2 Drawing Sheets

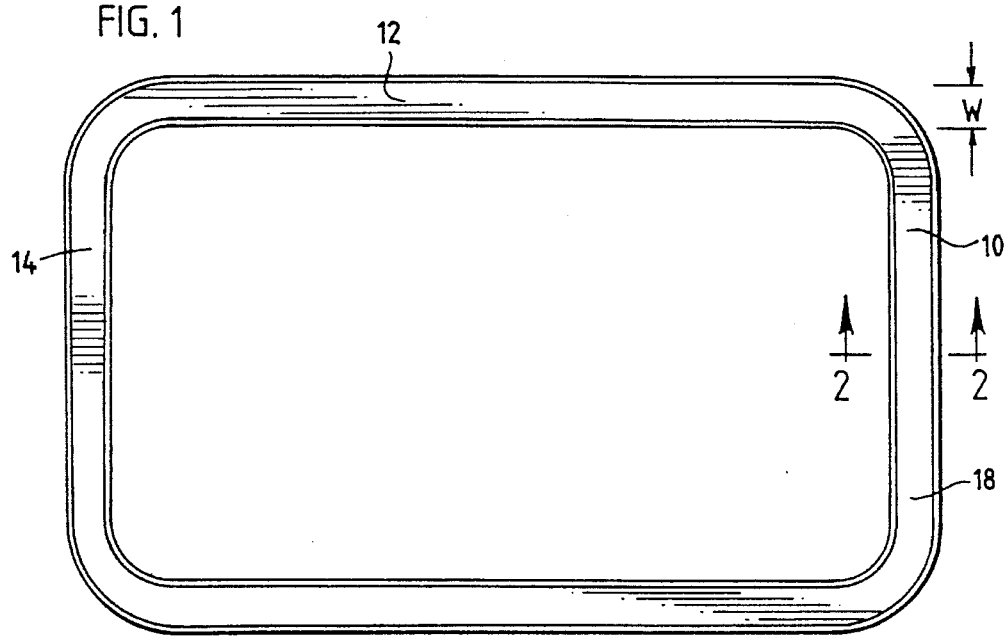
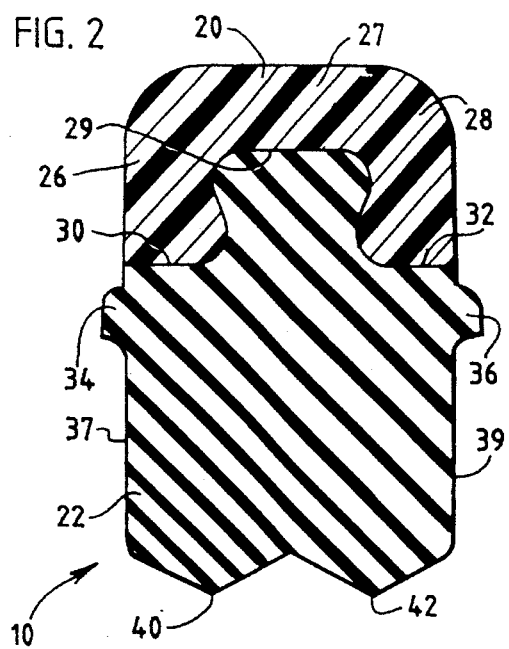
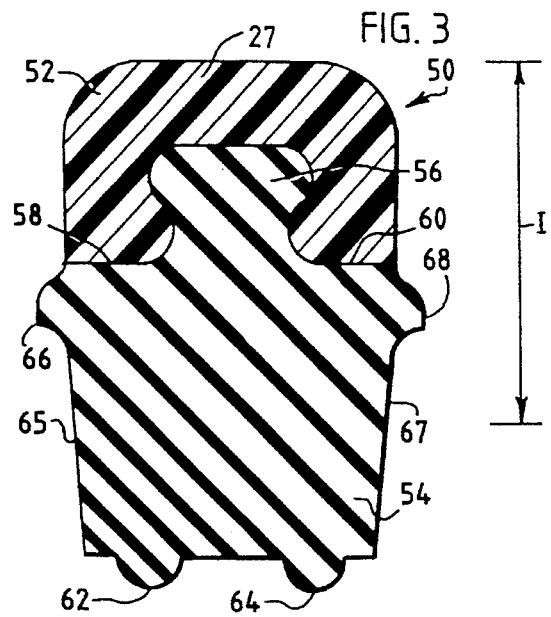

5,536,018

FLEXIBLE SPAGHETTI GASKET SEAL WITH STIFFENING MEMBER

BACKGROUND OF THE INVENTION

This invention relates to gaskets for engines and more particularly, to spaghetti seals installed in grooves in engine parts.

Engine gaskets are composed of various materials, depending on the operating environment in which the gasket is to operate. Chemical compatibility with the fluid being sealed, heat resistance, compressibility, and erosion resistance are just a few of the important factors of the operating environment which should be considered. Materials frequently used for engine gaskets can be divided between metallic (e.g. steel) and nonmetallic (e.g. fibers, rubber).

One type of engine gasket, commonly known as a "spaghetti seal", has particular requirements imposed by the operating environment. Spaghetti seals are often used as rocker cover and oil pan gaskets or for flanges that have sealing grooves to seal against splashed oil. They are characterized by their relatively small cross-sectional areas relative to their lengths, hence, their "spaghetti-like" appearance. Further, they are typically very limp. The spaghetti seals are usually inserted in narrow grooves within the surface of the rocker cover or oil pan (or mating part), which makes assembly of such seals problematic. Spaghetti seals are frequently formed of molded rubber in order to satisfy the compressibility and shape requirements. The rubber material, however, tends to be so flexible and limp as to make insertion of the seal into the narrow groove a difficult and time-consuming task.

It is therefore an object of the present invention to provide an improved spaghetti-type seal for engines which can be easily and quickly installed into a narrow groove in an engine or other part.

SUMMARY OF THE INVENTION

In accordance with the present invention a spaghetti seal is provided with improved characteristics for quickly and easily installing it in a groove of an engine part. The seal comprises a stiffening member secured to an elastomeric sealing member having a head and shoulder portions. The stiffening member fits along the bottom of the groove and provides for quicker and easier installation.

BRIEF DESCRIPTION OF THE DRAWINGS

FIG. 1 is a plan view of the invention.

FIG. 2 is a cross sectional view of the invention taken along line a—a of FIG. 1.

FIG. 3 is a cross sectional view of another embodiment of the invention.

DETAILED DESCRIPTION OF THE INVENTION

Figure 4:
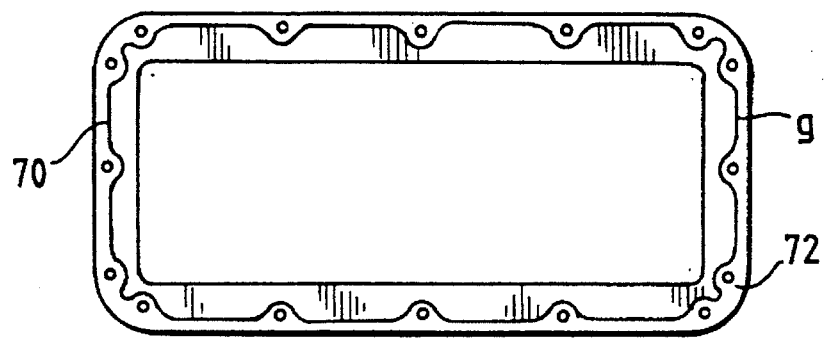
FIG. 4 is a plan view of a typical sealing assembly including the invention.

In FIG. 1, a spaghetti-type seal 10 is shown with a generally rectangular contour, although such seals often have more complicated contours. The width of seal 10, shown as dimension W, is typically far smaller than the length L of the seal, which in this case is the perimeter comprising the total length of sides 12, 14, 16 and 18, as well as being far smaller than each of the sides of the seal. Because such seals are of elastomeric material, such as silicone rubber and other highly flexible materials which form a limp overall seal, it is difficult to easily position and insert the seal in a groove in which it is to be seated.

The invention which solves that problem is shown in more detail in FIG. 2. The seal 10 includes a stiffening member such as a relatively stiff backbone 20 and an elastomeric gasket 22 secured together. The cross-section of the backbone is generally U-shaped with arms 26, 28 and base 27 defining a channel 29 therebetween. The head portion 24 of elastomeric gasket 22 fits within channel 29, while the arms 26, 28 of the backbone rest on the shoulders 30, 32 of the elastomeric member. The backbone 20 is preferably composed of a relatively stiff or rigid thermoplastic material, such as nylon, while the elastomeric gasket 22 is preferably molded of silicone rubber. Preferably, the backbone extends along substantially the entire length of the seal 10.

The backbone 20 and elastomeric gasket 22 can be manufactured and secured together in a variety of ways. The backbone can be formed by injection molding, and the elastomeric member may be secured thereto by simply molding the elastomeric member onto the pre-molded backbone, or they may be co-molded so that the backbone is formed with the gasket. Alternatively, the backbone and elastomeric gasket may be separately formed and secured together with a suitable adhesive. Further, the elastomeric gasket may define a channel or groove to receive projections from the backbone rather than vice versa as described above.

In all cases the backbone 20 acts as a stiffening member and provides rigidity to the seal so that it can be easily and effectively handled and can be quickly and easily inserted into the groove formed in a part, such as an engine part, to be sealed. To help retain the seal in the groove, the seal is inserted into the groove to a sufficient depth so that the stiffening member rests along the bottom of the groove and a portion of the elastomeric member also rests within the groove. The elastomeric member desirably includes an integrally-formed pair of opposing retaining beads 34, 36. These beads project outwardly from the sides 37, 39 of main body 38 of the gasket and beyond the backbone 20 to frictionally bear against the walls of the groove. In the embodiment of FIG. 2, elastomeric gasket 22 further includes a pair of integrally-formed sealing ribs 40, 42 which are generally peak-shaped in cross section. These ribs help perform the sealing function and bear against an engine part which opposes the part in which the groove is formed.

FIG. 3 shows another embodiment of the invention. As was true with the seal 10 of FIGS. 1 and 2, seal 50 of FIG. 3 includes a generally U-shaped, rigid backbone 52 and an elastomeric gasket 54. Backbone 52 has a head portion 56 and shoulders 58, 60. The only difference from the embodiment of FIG. 2 is the shape of the sealing ribs 62, 64. Instead of being peak-shaped, ribs 62, 63 are semi-circular in cross-section.

FIG. 3 also shows a typical depth to which a seal of this invention, such as seal 50, is inserted into a groove. Arrow D indicates the extent of the seal which is contained in a groove, i.e., the entire backbone 52 and the elastomeric member 54 are embedded in the groove to a depth between the retaining beads 66, 68 and ribs 62, 64. This leaves the ribs and the adjacent section of the elastomeric member outside of the groove and available for the sealing function, while the retaining beads and the remainder of the seal, including the rigidifying backbone, remain securely within the groove.

In FIG. 4, a sealing assembly according to the invention is shown for confronting and sealing against the flange of an oil pan (not shown). The spaghetti seal 70 rests within groove g which has been formed in engine block 72.

Figure 5:
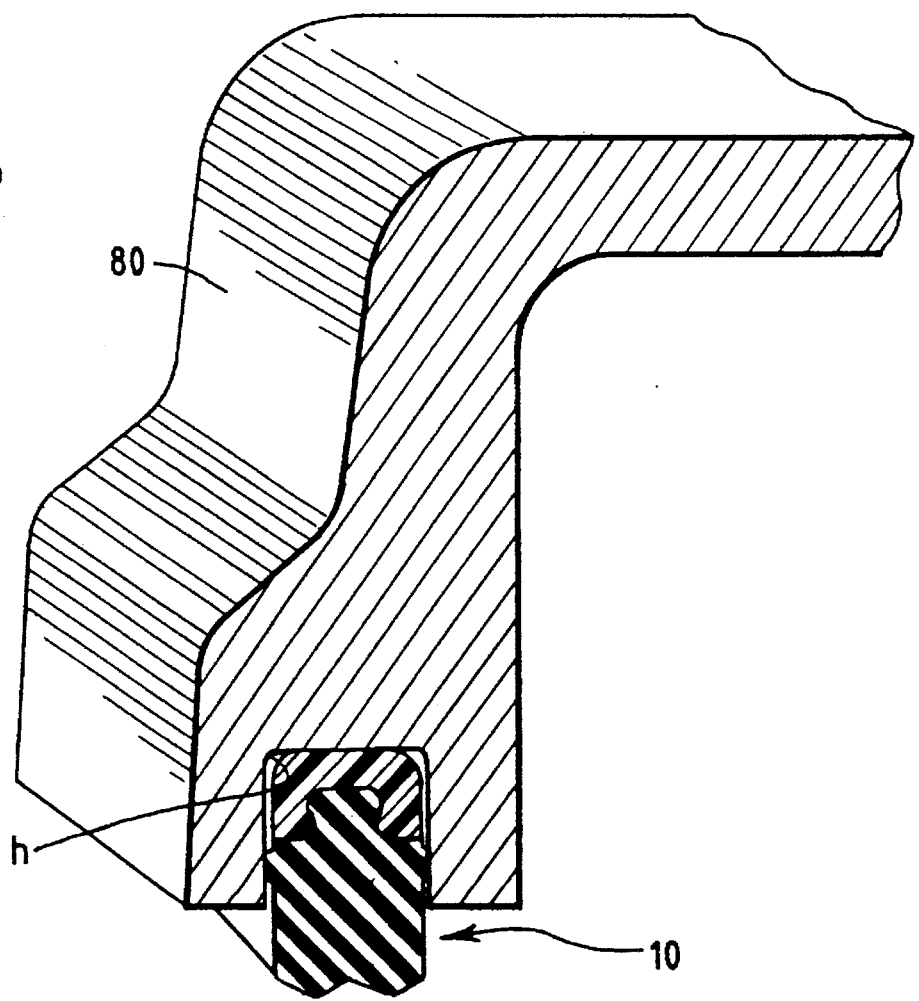
FIG. 5 is a partial perspective view of a rocker cover showing a cross-sectional view of the invention shown in FIG. 2 installed within the rocker cover.

FIG. 5 shows a seal 10 inserted within a groove h located in a rocker cover 80. The seal 10 extends beyond groove h so as to confront and seal against another engine part surface.

The spaghetti seal can be used with noise isolated and non-isolated joints and in a variety of environments other than automotive engines where insertion and installation of limp and flexible seals in grooves is difficult and time consuming. Further, the rigidifying backbones may be of plastic materials other than nylon, and the limp spaghetti seals or gaskets may be made of materials other than silicone rubber, such as fluoroelastomer rubber.

From the foregoing it will be apparent to those skilled in the art that modifications may be made without departing from the spirit and scope of the present invention. Accordingly, the invention is not intended to be limited except as may be made necessary by the appended claims.

What is claimed is:

1. A method of assembling a spaghetti seal in a groove in a first part to be sealed to a confronting second part, said groove including a bottom and an opening remote from said bottom, comprising the steps of:

providing a spaghetti seal comprising an elastomeric sealing member for sealing against said confronting second part, and a stiffening member affixed thereto to rigidify said sealing member for installation, said stiffening member having a base, and installing said spaghetti seal by inserting said stiffening member into said groove so that said stiffening member enters said groove opening before said elastomeric sealing member, with said sealing member projecting outwardly of said groove opening to confront said confronting second part and said base of said stiffening member resting along the bottom of said groove.

2. The method of claim 1 wherein said groove further includes opposing sides and said elastomeric sealing member further includes a pair of opposing retaining beads, and wherein said spaghetti seal is installed so that said retaining beads frictionally bear against said opposing sides of said groove.

3. The method of claim 1 wherein said elastomeric sealing member further includes a pair of sealing ribs projecting away from said stiffening member, and wherein said spaghetti seal is installed so that said sealing ribs project beyond said groove opening.

4. A method of assembling a spaghetti seal in a narrow groove in a first automotive engine part to be sealed to a confronting second automotive engine part, said groove including a bottom, opposing side walls, and an opening opposite said bottom, comprising the steps of:

providing a spaghetti seal comprising a limp elastomeric sealing member for sealing against said confronting second part, and a stiffening member affixed thereto to rigidify said limp sealing member, said sealing member having a head portion surrounded by said stiffening member and shoulders abutting against said stiffening member, said sealing member further having sides and a pair of opposing retaining beads projecting outwardly from said sides and beyond said stiffening member, positioning said spaghetti seal to overlie said groove, and installing said spaghetti seal by forcing said stiffening member into said groove so that said stiffening member lies entirely within said groove along said groove bottom and said retaining beads resiliently bear against the groove walls, said sealing member projecting outwardly from said groove opening to confront said confronting second part.

5. The method of claim 4 wherein said sealing member further includes a pair of sealing ribs projecting away from said stiffening member, wherein said rigidifying member is plastic, and wherein said installing step further includes the step of forcing said stiffening member into said groove to a depth such that said sealing ribs remain outside of said groove.

* * * * *